UNITED STATES PATENT OFFICE.

BÉLA DORNER, OF BUDAPEST, AUSTRIA-HUNGARY.

PROCESS OF UTILIZING INDIAN-CORN STRAW.

1,038,730. Specification of Letters Patent. Patented Sept. 17, 1912.

No Drawing. Application filed April 11, 1911. Serial No. 620,479.

*To all whom it may concern:*

Be it known that I, BÉLA DORNER, subject of the King of Hungary, residing at 6 Szentkirályiutcza, Budapest, in the Empire of Austria-Hungary, have invented a certain new and useful Improved Process of Utilizing Indian-Corn Straw, of which the following is a specification.

Indian corn-stalk *i. e.* Indian corn-straw (with the blades) possesses a certain degree of nutrition but investigations have shown that this degree of nutrition is so slight that Indian corn-straw alone cannot be used as fodder even when the animals do not work and it is only a case of maintaining their weight, for when the animals are fed with it, they begin to lose flesh. This is due to the composition of Indian corn-straw. The large percentage of cellulose contained in Indian corn-straw amounts to 30–35%, it reduces the value of the fodder because the cellulose can be digested by animals which chew the cud. the work of digestion however being greater than the nutritive value of the cellulose. The remaining constituent parts of Indian corn-stalk (Indian corn-straw) are the pentosanes and also the incrustating substances, which are neither pentosanes nor cellulose.

According to the present process, the cellulose, which is unsuitable for fodder, is separated from the Indian corn-straw in such a manner that a valuable fodder can be obtained and the cellulose can be employed for the manufacture of paper. In order to attain this double aim, the Indian corn-straw must undergo special treatment which is usually not carried out in the manufacture of cellulose.

When gathering in Indian corn-straw, it is arranged in pyramids on the soil, so that particles of earth adhere to the ends of the stalk. In order to free the stalk from the adhering earth, they are passed through a beating machine combined with an exhauster. It is necessary to render the cleaned stalks suitable for the extraction of the foodstuff which requires a very thorough preparation.

The materials suitable for foodstuffs, namely pentosan, gum and the like incrustating substances are not soluble in water or only to a very small extent (5–7%). The solvents usually employed, *i. e.* the mineral acids, are unsuitable, because they convert the cellulose into oxycellulose, which however is not suitable for the manufacture of paper because it easily turns into dust. Weaker acids must be employed, but this alone is also not sufficient, because the material between the cell-walls does not form a real solution with the solvent but only a suspended colloid; with respect thereto, the mass of cellulose fibers however acts as a filter, which does not allow the valuable foodstuffs to pass therethrough. The stalks must be prepared mechanically in such a manner that for the purpose of extraction of the intercellular materials, the fibers are afforded a very large area through disintegration. For this purpose, the chopped material is soaked in water and reduced to fibers in refiners. The water used for soaking is separated and subsequently employed for dissolving.

The valuable foodstuff is extracted from the material reduced to fibers by charging the fine flaky chopped straw into a boiler and boiling several hours with a weak acid, for example, with acetic acid, considerably diluted (0.2–0.4%) under moderate pressure (up to 3.8 atmospheres); several boilers are employed one behind the other so that the liquid used in the one boiler passes into the next boiler, thus working on the counter-current principle. Thus 17–18% of the stalk can be extracted. After boiling with acetic acid, the liquid is discharged, the boiler is filled with concentrated lime-water and the pressure in the boiler is again increased. After a short time, the lime-water is neutralized. As the liquid must be slightly basic, sufficient concentrated milk of lime is charged into the boiler to obtain concentrated lime-water, or a weak alkaline solution, for example, a diluted soda solution (about 0.2%) or a sodium-hydroxid solution (about 0.1%) is prepared in the boiler by charging the concentrated lye-solution in small portions into the boiler and mixing with the contents of the boiler by stirring. The concentration is continued so long as the lye takes up appreciable quantities of the material of the Indian corn-stalk. The termination of the yield is indicated by a retardation of the neutralization of the lye.

After the solution is discharged, a substance is left in the boiler, whose percentage of cellulose is comparatively increased, while its volume has gone back to about $\frac{1}{8}$–$\frac{1}{10}$ of the original volume. The extracted material suitable for a foodstuff amounts to 30–35% of the Indian corn-stalk (with respect to a dry-substance). The two extracted solutions are separately concentrated. The acetic acid vapors, which are exhausted during the concentration of the solution produced by means of acetic acid, are passed over lime-powder in order to reobtain the acetic acid. The two substances concentrated to the thickness of syrup are now combined and absorbed by fine-cut Indian corn-stalks. The syrup-like foodstuff containing about 20% moisture thus assumes a solid form and can be deposited in bags. The material is suitable for a foodstuff owing to its touch, appearance, smell and chemical composition.

A material is left in the boiler, which is suitable for producing cellulose. The materials, which are worthless for the manufacture of paper, have been mostly extracted, hence comparatively few chemicals are required for producing the cellulose. Sodium hydroxid (NaOH) which is more diluted than usual may thus be employed for dissolving the cellulose. The mechanical work of separating the bundles of fibers into elementary fibers is also considerably less, because the Indian corn-stalks were already subjected to preliminary treatment for the purpose of reducing the stalks to fiber. According to the usual method of producing cellulose, those materials, which are not cellulose, form with the dissolving lye a dark brown material, which also colors the cellulose, thus necessitating an expensive bleaching process. These costs are also decreased according to the present invention i. e. the quantity of chlorid of lime to be used is less. Since the volume of the material would be reduced considerably (to about $\frac{1}{8}$—$\frac{1}{10}$) the dimensions of the dissolving boilers may be less, less water is heated and a saving of fuel is effected.

Before filling the cellulose dissolving boilers with the material containing cellulose after the extraction, the material must be freed from a constituent of the parenchym cellulose which is unsuitable for further manufacture. This is chiefly the marrow of the Indian corn-stalk and when reducing to coarse fibers, it is crushed to a grit-like material, whereby it is quite unsuitable for the manufacture of paper. The parenchym-cellulose is removed in such a manner that the chopped straw or chaff removed from the foodstuff dissolving boiler is placed with water on a moving sieve, through the meshes of which the dustlike amorphous parenchym-cellulose with the water pass, while the cellulose suitable for further manufacture is moved away on the sieve. The water containing the parenchym-cellulose is placed on a sieve and separated from the parenchym-cellulose, which may be collected.

The hereindescribed process is suitable for ripe Indian corn-straw.

Having now particularly described and ascertained the nature of my said invention and in what manner the same is to be performed, I declare that what I claim and wish to secure by Letters Patent is:

1. A process for extracting foodstuffs from Indian corn-straw and for simultaneously producing a substance suitable for the manufacture of paper, consisting in reducing the Indian corn-straw to a fiber, subjecting the same under pressure to the action of a strongly diluted organic acid, discharging the liquid, treating the straw under pressure with a strongly diluted alkaline liquid for completing the extraction, discharging the solution obtained and finally concentrating and mixing this solution and the solution first obtained to the thickness of syrup, as and for the purpose specified.

2. A process for extracting foodstuffs from Indian corn-straw and for simultaneously producing a substance suitable for the manufacture of paper, consisting in reducing the Indian corn-straw to a fiber, subjecting the same under moderate pressure to the action of a strongly diluted (0.2–0.4%) acetic acid solution, discharging the liquid, treating the straw under pressure with a strongly diluted soda solution and finally mixing this solution and the solution first obtained as and for the purpose specified.

3. A process for extracting foodstuffs from Indian corn-straw and for simultaneously producing a substance suitable for the manufacture of paper, consisting in reducing the Indian corn-straw to a fiber, subjecting the same under moderate pressure to a strongly diluted (0.2–0.4%) acetic acid solution, discharging the liquid, treating the straw under pressure with a strongly diluted sodium-hydroxid solution, and finally mixing this solution with the solution first obtained as and for the purpose specified.

In testimony whereof I affix my signature in presence of two witnesses.

BÉLA DORNER.

Witnesses:
 BEIN GRUWNWALD, Jr.,
 HUGH KENING.